US005702511A

United States Patent [19]
de Saint-Romain et al.

[11] Patent Number: 5,702,511
[45] Date of Patent: Dec. 30, 1997

[54] INK COMPOSITION FOR MARKING AND AUTHENTICATING OBJECTS

[75] Inventors: Pierre de Saint-Romain; Alain Heraud, both of Valence, France

[73] Assignee: Image S.A., Bourg-Les-Valence, France

[21] Appl. No.: 591,802

[22] Filed: Jan. 25, 1996

[30] Foreign Application Priority Data

Feb. 14, 1995 [FR] France .................. 95 01665

[51] Int. Cl.$^6$ .................. C09D 11/00
[52] U.S. Cl. .................. 106/31.32; 106/31.15; 106/31.58; 106/31.37
[58] Field of Search .................. 106/21 R, 21 A, 106/22 B, 31.32, 31.15, 31.58, 31.37

[56] References Cited

U.S. PATENT DOCUMENTS

| | | | |
|---|---|---|---|
| 3,866,083 | 2/1975 | Laxer | 106/21 A |
| 3,928,226 | 12/1975 | McDonough et al. | 106/21 A |
| 4,015,131 | 3/1977 | McDonough et al. | 106/21 A |
| 5,084,204 | 1/1992 | Auslander | 252/301.16 |
| 5,135,569 | 8/1992 | Mathias | 106/22 |
| 5,256,192 | 10/1993 | Liu et al. | 106/21 A |
| 5,551,973 | 9/1996 | Oliver et al. | 106/21 A |
| 5,569,317 | 10/1996 | Sarada et al. | 106/21 A |

FOREIGN PATENT DOCUMENTS

| | | | |
|---|---|---|---|
| 0 253 543 | 1/1988 | European Pat. Off. | C09D 11/02 |
| 0 314 350 | 5/1989 | European Pat. Off. | C07D 265/22 |
| 0 327 788 | 8/1989 | European Pat. Off. | C09D 11/02 |
| WO 91/05833 | 5/1991 | WIPO | C09K 11/02 |

*Primary Examiner*—Helene Klemanski
*Attorney, Agent, or Firm*—Pearne, Gordon, McCoy & Granger LLP

[57] ABSTRACT

This aim of the invention is to develop an ink composition comprising at least one non-photochromic pigment or dye, a photochromic pigment or dye and a solvent, the photochromic pigment or dye changing absorption spectrum under the effect of a first light emitting in a wavelength belonging to the ultra-violet range, so that when it is subsequently illuminated by a second light only emitting in a wavelength belonging to the visible range, it has a color different from that which it had, under the illumination of said second light, prior to illumination by said first light, said color also differing from that of the non-photochromic pigment or dye when the latter is illuminated by said second light.

12 Claims, No Drawings

INK COMPOSITION FOR MARKING AND AUTHENTICATING OBJECTS

The invention relates to an ink composition for marking and authenticating objects.

Ink jet printing is a well known method permitting the printing, marking or decoration of all types of objects, at high speed and without any contact between the printing device and said objects. Randomly variable messages can thus be placed on planar or non-planar supports, such as paper, cloth, ceramics, plastics or metals. These printing systems can be of the "droplet on demand" or "continuous jet" type.

The ingredients of existing inks are organic products, dyes or pigments dissolved in solvents of varying volatility or in water, resins and various additives giving the chemical stability or conductivity necessary for the electrostatic deflection, particularly in the case of continuous ink jet printers.

In the fight against counterfeiting, the production of forbidden photocopies or more generally for ensuring authenticity to certain documents, specific inks have been developed. These inks incorporate colourless products, i.e. invisible to the naked eye in visible light, but which can be observed:

a) either by illuminating them with a light having a particular wavelength such as the ultraviolet, which gives rise to the fluorescence or phosphorescence of the ink, which then becomes visible, b) or by making them react with other products rendering them visible to the naked eye.

In case a), the colour change is reversible. As soon as the exposure to the particular light (UV) stops and after a very short time, the ink reassumes its initial, invisible appearance. The type of compound responsible for this phenomenon absorbs light at a certain wavelength and reemits it at a higher wavelength for the exposure time. Such inks are in particular disclosed in U.S. Pat. No. 4,153,593 and U.S. Pat. No. 4,328,332.

U.S. Pat. No. 4,153,593 describes a fluorescent ink usable in an ink jet printing machine and incorporating water, a humidifier and a combination of a fluorescent ink and a fluorescence brightening agent.

U.S. Pat. No. 4,328,332 describes an ink for ink jet printing and more particularly the fluorescent resins used for the production of said ink.

In case b), the colour change is irreversible. Such compositions are e.g. described in U.S. Pat. No. 4,029,506 relating to a marking composition incorporating a photosensitive product, which becomes coloured in the presence of a pigment. More specifically, said marking composition comprises a colourless composition sensitive to radiation, a pigment able to reflect the wavelength of the light absorbed by the pigment and a colourless polymer binder. This marking composition is used for covering the surface of a product and then the thus formed coating is exposed to the radiation of the visible spectrum in accordance with a specific design, so as to form exposed areas and unexposed areas having differences in the reflectance density which are sufficient to permit the reading of the thus formed marking.

More recently, products having the special feature of changing absorption spectrum under the effect of light have appeared. These products are called "photochromic inks". EP 327 788 and GB 2 192 006 describe various applications of such inks. Generally, said photochromic inks are invisible under normal illumination conditions and become visible, i.e. having e.g. a blue or green colour, following illumination under ultraviolet light. Thus, for example, a document on which inscriptions are made with blue or green ink on a background covered by a photochromic ink cannot be photocopied. Thus, when the document is exposed to the radiation of the photocopier, the background of the document is tinted blue or green and the inscriptions made with normal ink can no longer be distinguished from the background.

EP 327 788 discloses a photochromic ink for reversible printing. This ink comprises a polymer binder, a liquid phase and a photochromic compound protected against oxygen by a polymer composition. This ink can be used for printing banknotes, cheques, travellers cheques, stamps, passports or aircraft or ship tickets or any similar document for which it is necessary to take anti-counterfeiting measures.

GB 2 192 006 describes a photochromic ink for irreversible marking. The ink composition comprises a 1,2-dihydroquinoline (DHQ) solution in a polymer solution. The irreversible marking is obtained after irradiation under ultraviolet light.

However, the aforementioned inks do not make it possible to solve all authentication problems. Thus, numerous objects such as headed notepapers, envelopes, fabrics, plastic packings, etc. are provided with a marking visible to the naked eye (i.e. in the visible range) and e.g. intended to indicate an address, an origin, a registered trademark, the composition of a product or its bar code.

However, such products are sometimes copied and their marking can be falsified so as to give information slightly different from that normally appearing on the original products, e.g. addresses or bar codes. Moreover, other products, such as e.g. luxury products, can be copied by products having a similar appearance, but having a mediocre quality, on which a famous mark has been identically copied. Finally, in the postal franking field, certain dispatches in large numbers such as newspapers are not franked by stamps, but with the aid of an inscription containing a code and a routing number. These informations can be illegally reproduced, without e.g. paying the sum normally due for franking purposes.

The object of the invention is to develop an ink composition permitting the normal marking of products, i.e. a visible marking in the visible light range and simultaneously ensuring an authentication of the marked product by a colour change of the marking under certain conditions. Preferably, this colour change phenomenon is not reversible, so as to permit several successive checks of the authenticity-of the marked product.

For this purpose, the invention relates to an ink composition for marking and authenticating objects.

According to features of the invention, it comprises at least one non-photochromic pigment or dye (preferably up to approximately 15 wt.%), a photochromic pigment or dye (preferably up to approximately 10 wt.%) and a solvent, the photochromic pigment or dye changing absorption spectrum under the effect of a first light emitting at a wavelength belonging to the ultraviolet range, so that when it is then illuminated and only by a second light emitting in a wavelength belonging to the visible range, it has a ("second") colour different from that which it had, under the illumination of said second light, prior to its illumination by said first light, said ("second") colour also being different from that of the non-photochromic pigment or dye when the latter is illuminated by said second light.

The material is respectively called dye or pigment depending on whether it is soluble or insoluble and therefore dispersed in the solvent used.

Thus, for example, it is possible to use a photochromic pigment or dye, which is invisible in the visible range and which becomes blue or green after it has been exposed to ultraviolet radiation and a non-photochromic pigment or dye, which is red or any other colour except blue or green when it is in the visible range.

According to another embodiment of the invention, the non-photochromic dye or pigment can e.g. be fluorescent under ultraviolet illumination or illumination in the visible range.

Thus, for example, it is possible to combine an orange, non-photochromic dye fluorescent under visible light and a photochromic dye invisible under visible light, but which becomes blue after illumination with ultraviolet rays, due to the absorption of the orange light from the non-photochromic dye.

The phenomenon is reversible and the thus produced marking will reassume its initial colour in a time which can vary between a few seconds and a few hours, protected from the exciting light of the photochromic dye.

As a result of the characteristics of the invention, if a counterfeiter merely reproduces the marking with a standard ink of the same colour (invisible light) as that of the non-photochromic pigment or dye, his counterfeiting action will easily be detectable after passage under UV because it will not change colour. The use of a composition according to the invention of a more complex and therefore more expensive nature makes the work of counterfeiters more difficult.

The ink composition can also comprise a resin or a natural or synthetic polymer, a conductivity salt and/or an additive.

Advantageously, the photochromic pigment or dye is chosen from among stilbene, indigo, thio-indigo, spiropyrans, spirooxazines, fulgides, dithizonates, endoperoxides or their derivatives.

The non-photochromic pigment or dye can be a product of the dye type soluble in solvents (known under the term solvent dye), a pigment or a direct, reactive, basic or acid dye (according to the definition of the colour index, or a product not reference in the colour index), provided that its colour and solubility are compatible with the remainder of the composition. The non-photochromic dye or pigment is not necessarily fluorescent, but as stated hereinbefore and according to an embodiment of the invention the non-photochromic dye or pigment can also e.g. be fluorescent under ultraviolet illumination or under illumination in the visible range.

The solvent used is generally water or an organic solvent chosen from among alcohols, ketones, esters, or aromatic hydrocarbons. Among the alcohols, reference can be made to methanol, ethanol and propanols (less toxic for the user) or glycerin and among the ketones reference can be made to cyclohexanone or aliphatic ketones, such as methyl ethyl ketone or methyl isobutyl ketone. These solvents are chosen so that the solubility of the dyes or the dispersibility of the pigments is adequate.

The choice of the resins is dictated by their solubility in selected solvents and by their compatibility with the dyes and other additives used. These resins are generally chosen from among acrylic, vinyl, ketone, phenolic, cellulose, styrene, polyester, epoxy or polyurethane resins. The function of said resins is to aid the adhesion to the dye on the selected support. When the ink is deposited on a porous support, e.g. of the fabric or paper type, the resin is not vital. However, on using non-porous supports, such as plastics or metal, the resin is necessary for fixing the marking made.

The conductivity salt is only used when the ink composition is intended for use in a continuous ink jet printer. In such a printer, a second ink jet formed by a nozzle is broken down into several small droplets of identical size. These droplets are electrically charged by passage through two charging electrodes and are then deflected in space under the action of an electric field between the two deflecting electrodes. Thus, the droplets are displaced as a function of their charge in a plane perpendicular to the displacement direction of the substrate on which the marking has been made. This conductivity salt is an ionizable salt and in particular an alkali metal or alkaline earth salt, or an amine or ammonium salt, chosen from among chlorides, bromides, iodides, thiocyanates, nitrates, perchlorates, acetates and propionates. Preferably, said salt is sodium thiocyanate.

The additive is advantageously an anit-foaming agent, a chemical stabilizer, a UV stabilizer, a bactericide or a fungicide, considered singly or in combination.

The invention will be better understood from reading the following description of an embodiment of the invention given in an illustrative and non-limitative manner.

The following ink jet compositions have been prepared by mixing the products given in the following table 1.

TABLE 1

|  | Ex. 1 wt. % | Ex. 2 wt. % | Ex. 3 wt. % | Ex. 4 wt. % |
| --- | --- | --- | --- | --- |
| non-photochromic dye |  |  |  |  |
| fluorescent orange dye 1 | 5 | 5 | 0 | 4.6 |
| fluorescent orange dye 2 | 0 | 0 | 11.8 | 0 |
| photochromic dye |  |  |  |  |
| spirooxazine dye 1 | 1 | 1 | 0.2 | 0 |
| spirooxazine dye 2 | 0 | 0 | 0 | 0.9 |
| binder: resins |  |  |  |  |
| ACrylic resin | 20.7 | 0 | 0 | 0 |
| Phenolic resin | 0 | 29 | 0 | 0 |
| Ketone resin | 0 | 0 | 0 | 36.1 |
| Conductivity salt |  |  |  |  |
| Sodium thiocyanate | 1 | 1 | 1 | 2.2 |
| Solvents |  |  |  |  |
| Methyl ethyl ketone | 72.3 | 64 | 0 | 56.1 |
| 95% ethanol | 0 | 0 | 87 | 0 |
| Physical parameters |  |  |  |  |
| Viscosity (mPa · s) | 4.3 | 5.7 | 4.7 | 4.9 |
| Conductivity (ms/cm) | 1.12 | 0.93 | 1.24 | 0.82 |

The four ink compositions prepared in this way were tested in IMAJE series 7 printers manufactured by IMAJE and make it possible to obtain excellent quality impressions. In addition, films having larger dimensions were produced on different plastic supports and papers in order to measure their colours on a homogeneous flat tint. With the aid of a Tristimulus colorimeter, measurement took place of the colour (a*b*) and brightness (L*) of the thus formed films before and immediately after illumination by ultraviolet radiation. The respective values of L* and a*b* are given hereinafter for each of the four examples (a* representing the component along the green-red axis and b* the component along the blue-yellow axis of the chromatic plane). It should be noted that a difference of a few units of a* or b* is perfectly visible to the naked eye. In the following examples, the colour change is obtained by an illumination for 5 minutes using an 8 Watt UV lamp located 5 cm from the ink-covered film. The lamp used emits most of its radiation at around 350 nm.

EXAMPLE 1

The photochromic dye used is colourless in the visible range and becomes blue after illumination under ultraviolet light. The non-photochromic dye is fluorescent orange. The marking obtained is fluorescent orange in the visible range and becomes ochre and non-fluorescent after UV illumination.

The values of L*, a* and b* before and after illumination are as follows:

|        | L*   | a*   | b*   |
|--------|------|------|------|
| before | 91.3 | 30.2 | 42.5 |
| after  | 96.2 | 16.6 | 33.9 | before 91.3 30.2 42.5
after 96.2 16.6 33.9

The return to the starting colour takes place after about 10 minutes.

EXAMPLE 2

The dyes and solvent used are the same as in example 1, but the binder is of a different type. The values of L*, a* and b* before and after illumination are as follows:

|        | L*   | a*    | b*   |
|--------|------|-------|------|
| before | 75.7 | 6.6   | 23.6 |
| after  | 61.4 | −14.8 | 5.8  | before 75.7 6.6 23.6
after 61.4 −14.8 5.8

The marking obtained is brown and non-fluorescent in the visible range and becomes non-fluorescent grey-green after UV illumination.

The return to the starting colour is obtained in more than 20 minutes.

EXAMPLE 3

The photochromic dye used is still the same as in example 1. The fluorescent dye is of a different type from the preceding examples and the solution is prepared in ethanol.

The values of L*, a* and b* before and after illumination are as follows:

|        | L*   | a*   | b*   |
|--------|------|------|------|
| before | 86.7 | 49.6 | 43.5 |
| after  | 71.7 | 38.7 | 19.7 | before 86.7 49.6 43.5
after 71.7 38.7 19.7

The marking obtained is rose fluorescent in the visible range and becomes non-fluorescent violet after UV illumination.

The return to the starting colour is obtained in more than 60 minutes.

EXAMPLE 4

The photochromic dye is different from that of the preceding examples, but has the same property. It is colourless in the visible range and turns blue after UV illumination. Its colouring power is stronger than in the previous cases.

The values of L*, a* and b* before and after illumination are as follows:

|        | L*   | a*   | b*   |
|--------|------|------|------|
| before | 87.5 | 52.5 | 45.1 |
| after  | 74.8 | 32.3 | 24.9 | before 87.5 52.5 45.1
after 74.8 32.3 24.9

The marking obtained is orange and very fluorescent in the visible range and becomes ochre and non-fluorescent after UV illumination. The return to the starting colour is obtained in about 15 minutes.

We claim:

1. Ink composition for marking and authenticating objects, comprising at least one non-photochromic pigment or dye, a photochromic pigment or dye and a solvent, the photochromic pigment or dye changing absorption spectrum under the effect of a first light emitting in a wavelength belonging to the ultraviolet range, so that when it is then illuminated and only by a second light emitting in a wavelength belonging to the visible range, it has a colour different from that which it had, under the illumination of said second light, prior to its illumination by said first light, said colour also being different from that of the non-photochromic pigment or dye when the latter is illuminated by said second light.

2. Ink composition according to claim 1, wherein the non-photochromic dye or pigment is fluorescent.

3. Ink composition according to claim 1, further comprising a synthetic or natural polymer or resin for permitting the fixing of the ink composition on a non-porous support.

4. Ink composition according to claim 1, further comprising a conductivity salt.

5. Ink composition according to claim 1, further comprising an additive selected from the group consisting of an anti-foaming agent, a chemical stabilizer, a UV stabilizer, a bactericide or a fungicide, or mixtures thereof.

6. Ink composition according to claim 1, wherein the photochromic pigment or dye is selected from the group consisting of stilbene, indigo, thio-indigo, spiropyrans, spirooxazines, fulgides, dithizonates, endoperoxides or their derivatives.

7. Ink composition according to claim 1, wherein the solvent is water or an organic solvent.

8. Ink composition according to claim 7, wherein the organic solvent is selected from the group consisting of alcohols, ketones, esters or aromatic hydrocarbons.

9. Ink composition according to claim 3, wherein the resin is selected from the group consisting of acrylic, vinyl, ketone, phenolic, cellulose, styrene, polyester, epoxy or polyurethane resins.

10. Ink composition according to claim 4, wherein the conductivity salt is sodium thiocyanate.

11. Ink composition according to claim 1, wherein said ink comprises up to approximately 15 wt. % non-photochromic pigment or dye and up to about 10 wt. % photochromic pigment or dye.

12. Ink composition according to claim 2 wherein the non-photochromic dye or pigment is fluorescent under ultraviolet illumination or illumination in the visible range.

* * * * *